(12) United States Patent
Thompson et al.

(10) Patent No.: US 11,890,943 B1
(45) Date of Patent: Feb. 6, 2024

(54) HIGH-RESOLUTION WHEEL SPEED SENSOR FOR A VEHICLE

(71) Applicant: Parker-Hannifin Corporation, Cleveland, OH (US)

(72) Inventors: Randall Thompson, Landcaster, SC (US); Cleatis Elisha Cutshall, Mosheim, TN (US); Michael Tholan Crosby, Jonesborough, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 630 days.

(21) Appl. No.: 17/101,440

(22) Filed: Nov. 23, 2020

Related U.S. Application Data

(60) Provisional application No. 62/943,563, filed on Dec. 4, 2019.

(51) Int. Cl.
| | | |
|---|---|---|
| *B60K 7/00* | (2006.01) | |
| *B60L 15/20* | (2006.01) | |
| *G01P 3/44* | (2006.01) | |
| *B60B 27/00* | (2006.01) | |

(52) U.S. Cl.
CPC ........ *B60K 7/0015* (2013.01); *B60B 27/0068* (2013.01); *B60L 15/20* (2013.01); *G01P 3/44* (2013.01); *B60K 7/0007* (2013.01); *B60K 2007/0038* (2013.01)

(58) Field of Classification Search
CPC ................ B60K 7/0015; B60K 7/0007; B60K 2007/0038; B60B 27/0068; B60L 15/20; G01P 3/44
See application file for complete search history.

(56) References Cited

U.S. PATENT DOCUMENTS

| | | | |
|---|---|---|---|
| 3,772,549 A | | 11/1973 | Cumming |
| 3,787,769 A | * | 1/1974 | Parkinson ............... G01P 3/488 |
| | | | 73/507 |
| 3,949,841 A | | 4/1976 | Jovick et al. |
| 4,171,495 A | | 10/1979 | McNinch, Jr. |
| 4,698,536 A | | 10/1987 | Oohori |
| 5,080,500 A | * | 1/1992 | Hilby ...................... G01P 3/443 |
| | | | 310/168 |
| 5,127,747 A | * | 7/1992 | Hilby ...................... G01P 3/443 |
| | | | 310/168 |

(Continued)

FOREIGN PATENT DOCUMENTS

| | | |
|---|---|---|
| CN | 208544105 U | 2/2019 |
| JP | 2019053013 A | 4/2019 |

(Continued)

*Primary Examiner* — Phutthiwat Wongwian
*Assistant Examiner* — Sherman D Manley
(74) *Attorney, Agent, or Firm* — McDonnell Boehnen Hulbert & Berghoff LLP

(57) ABSTRACT

A motor for a vehicle includes a motor housing, a motor shaft, a hub, and a wheel speed sensor assembly. The motor shaft is disposed at least partially within the motor housing. The hub is configured to be coupled to the motor shaft and to be coupled to a wheel of the vehicle. The wheel speed sensor assembly includes a first end that is coupled to the motor housing and a second end that is rotatably coupled to the hub. The wheel speed sensor assembly is configured to generate a wheel speed signal that facilitates determination of a speed and direction of rotation of the wheel.

20 Claims, 6 Drawing Sheets

(56) References Cited

U.S. PATENT DOCUMENTS

| | | | | |
|---|---|---|---|---|
| 5,355,511 A * | 10/1994 | Hatano | G08G 1/20 | 455/457 |
| 5,640,087 A * | 6/1997 | Alff | G01P 1/026 | 324/173 |
| 6,033,040 A * | 3/2000 | Inagaki | B60T 8/246 | 303/116.3 |
| 6,575,282 B2 * | 6/2003 | Perlick | F16D 31/04 | 192/56.6 |
| 7,004,290 B2 * | 2/2006 | Ohtsuki | G01P 3/443 | 188/162 |
| 8,237,431 B2 | 8/2012 | Fruehling et al. | | |
| 9,090,142 B2 * | 7/2015 | Lee | B60K 17/043 | |
| 11,597,282 B1 * | 3/2023 | Thompson | B60L 3/0061 | |
| 2003/0122539 A1 * | 7/2003 | Heimann, Jr. | G01P 3/488 | 324/207.22 |
| 2004/0074317 A1 * | 4/2004 | Colombo | G01L 5/0009 | 73/862.392 |
| 2006/0061352 A1 * | 3/2006 | Koyagi | G01P 3/446 | 324/173 |
| 2006/0124368 A1 * | 6/2006 | Plishner | B60L 15/20 | 180/65.6 |
| 2010/0285917 A1 * | 11/2010 | Rahm | F16H 48/11 | 475/220 |
| 2012/0159916 A1 * | 6/2012 | Ishii | B60L 1/003 | 56/10.2 G |
| 2012/0244980 A1 * | 9/2012 | Su | B60K 17/046 | 475/149 |
| 2012/0256472 A1 * | 10/2012 | Takahashi | B60L 3/0061 | 301/6.5 |
| 2012/0312608 A1 * | 12/2012 | Baumgartner | B60K 7/0007 | 301/6.5 |
| 2013/0012350 A1 | 1/2013 | Ebner | | |
| 2013/0048394 A1 * | 2/2013 | Su | B60K 17/046 | 180/60 |
| 2014/0086517 A1 * | 3/2014 | Norimatsu | B60B 35/18 | 384/448 |
| 2014/0103783 A1 * | 4/2014 | Vogler | H02K 11/20 | 310/68 B |
| 2016/0068056 A1 * | 3/2016 | Burtov | B60K 7/0007 | 180/65.51 |
| 2019/0135273 A1 * | 5/2019 | Safstrom | G01P 3/481 | |
| 2019/0154721 A1 * | 5/2019 | Falossi | F16C 41/007 | |
| 2019/0329809 A1 | 10/2019 | Mackay | | |
| 2020/0039289 A1 * | 2/2020 | Morello | B60B 27/0068 | |
| 2020/0130738 A1 * | 4/2020 | Kodera | B62D 6/008 | |
| 2022/0016928 A1 * | 1/2022 | Shin | B60K 7/0007 | |
| 2022/0099508 A1 * | 3/2022 | Kang | H02J 50/10 | |
| 2022/0258531 A1 * | 8/2022 | Piele | B60B 27/0021 | |

FOREIGN PATENT DOCUMENTS

| | | |
|---|---|---|
| KR | 20140076441 A1 | 6/2014 |
| WO | 2013/157999 A1 | 10/2013 |
| WO | 2015156888 A1 | 10/2015 |

* cited by examiner

HIGH-RESOLUTION WHEEL SPEED SENSOR FOR A VEHICLE

RELATED APPLICATIONS

This application claims the benefit of priority under 35 U.S.C. § 119(e) of U.S. Provisional Application No. 62/943,563, filed Dec. 4, 2019, the content of which is incorporated herein by reference in its entirety.

BACKGROUND

Field

This application generally relates to vehicles such as zero turning radius (ZTR) vehicles. In particular, this application describes a drive system with a high-resolution wheel speed sensor for a vehicle.

Description of Related Art

Certain vehicles such as zero turning radius vehicles utilize a steering control, such as a pair of control levers, to control the speed and direction of the drive wheels of the vehicle. For example, a left control lever may control the speed and direction of a left drive wheel, and a right control lever may control the speed and direction of a right drive wheel.

Such vehicles may utilize hydraulic or electric motors to drive the wheels. In the case of hydraulic motors, a combustion engine may turn a hydraulic pump that, in turn, provides hydraulic fluid under pressure to a hydrostatic transmission. The hydrostatic transmission redirects the hydraulic fluid to the hydraulic motors responsive to the position of the control levers. In the case of electric motors, the motors may turn at a rate and in direction responsive to the position of the control levers.

SUMMARY

In a first aspect, a motor for a vehicle may include a motor housing, a motor shaft, a hub, and a wheel speed sensor assembly. The shaft is disposed at least partially within the motor housing. The hub is configured to be coupled to the motor shaft and to be coupled to a wheel of the vehicle. The wheel speed sensor assembly includes a first end that is coupled to the motor housing and a second end that is rotatably coupled to the hub. The wheel speed sensor assembly is configured to generate a wheel speed signal that facilitates determination of a speed and direction of rotation of the wheel.

In a second aspect, a vehicle includes a motor and a controller. The motor includes a motor housing, a motor shaft, a hub, and a wheel speed sensor assembly. The hub is coupled to the motor shaft and is configured to be coupled to a wheel of the vehicle. The wheel speed sensor assembly includes a first end that is coupled to the motor housing and a second end that is rotatably coupled to the hub. The wheel speed sensor assembly is configured to generate a wheel speed signal that facilitates determination of a speed and direction of rotation of the wheel. The controller is in communication with the wheel speed sensor. The controller is configured to operate the motor responsive to the wheel speed signal generated by the wheel speed sensor assembly.

In a third aspect, a method for operating a vehicle includes receiving, by a controller, a wheel speed signal from a wheel speed sensor assembly coupled to both a motor housing and a wheel hub of the vehicle. The wheel speed signal generated by the wheel speed sensor assembly facilitates measuring an angle of rotation of a wheel coupled to the wheel hub to within less than 1°. The method includes determining, by the controller, a speed and direction of rotation of the wheel based on the wheel speed signal. The method further includes operating, by the controller, the motor of the vehicle responsive to the wheel speed signal to increase power to the motor when the determined speed falls below a target speed, and to decrease power to the motor when the determined speed is above the target speed.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1:
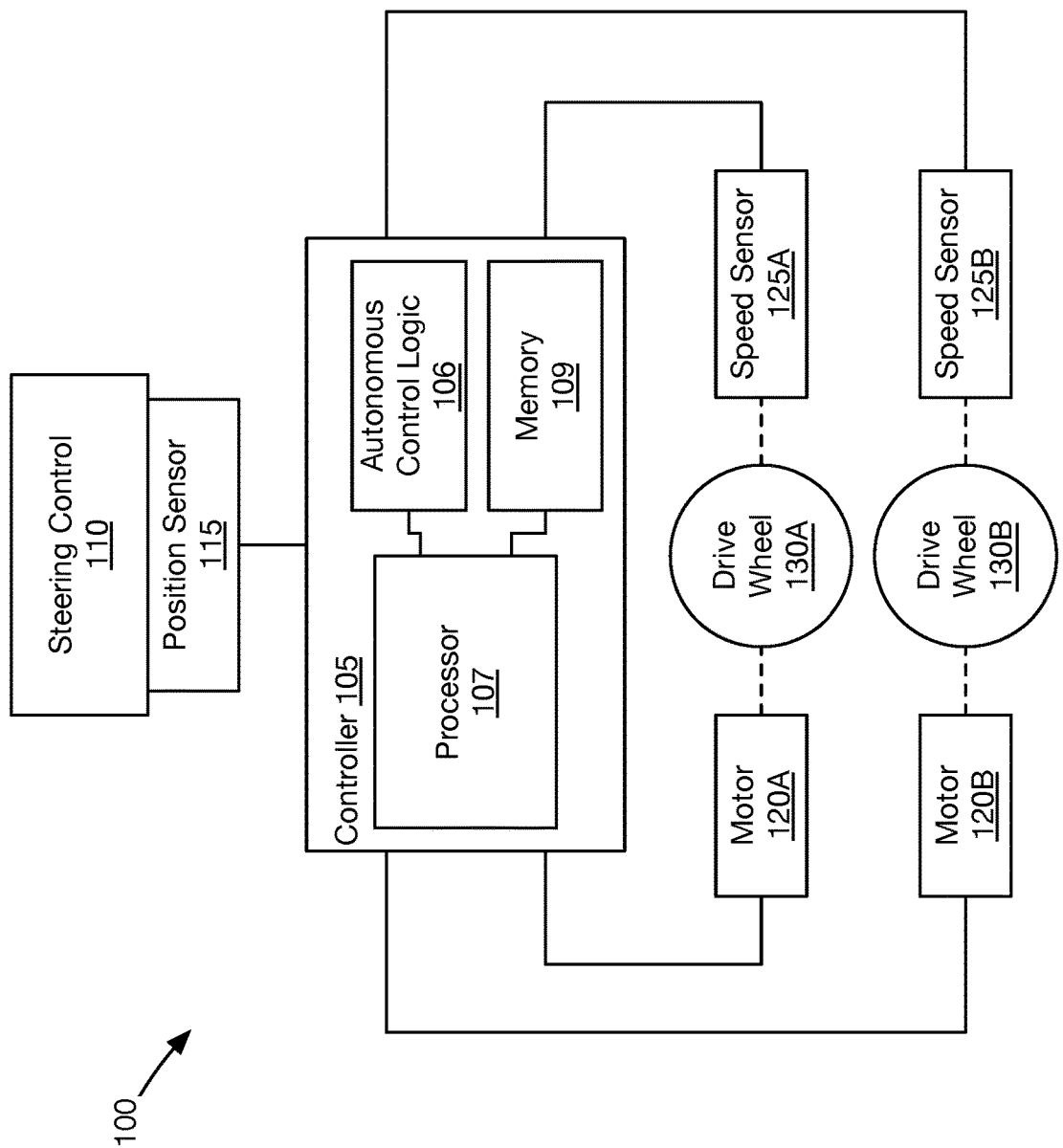
FIG. 1 is a schematic representation of an example of a drive system for a vehicle, in accordance with an example.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein. Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. Introduction

As noted above, certain types of vehicles may utilize hydraulic or electric motors to drive the wheels. The motors may turn the drive wheels of the vehicle responsive to the position of a steering control such as a pair of control levers, a steering wheel, a stick control, etc. In some cases, the vehicle may include a drive system that receives position signals from the steering control and controls the motors based on the position signals.

Some of these vehicles may include a device for measuring the speed of the vehicle. The device may be placed in proximity to a gear. Rotation of the gear may generate magnetic fluctuations within the device that are subsequently detected by a Hall-effect sensor of the device.

Resolution in the detected speed provided by some devices can be somewhat limited. For example, a given wheel may be required to rotate by more than 1° before the device can detect movement of the wheel. This, in turn, can make it difficult to accurately measure the speed of the wheel, which may be important in certain applications. For example, conventional speed sensors may not provide the resolution needed to allow an autonomous vehicle to make precise movements.

These problems are overcome by the examples described below. In the examples, a given drive wheel of a vehicle may be coupled to a high-resolution wheel speed sensor assembly configured to generate a wheel speed signal indicative of the rate and direction in which the wheel turns. The drive system may receive the wheel speed signal from a wheel speed sensor of the wheel speed sensor assembly and control one or more motors of the vehicle based on the wheel speed signal.

FIG. 1 is a schematic representation of an example of a drive system 100 for a vehicle. The vehicle may correspond to a zero turning radius (ZTR) vehicle or similar vehicle capable of performing precise movements. The drive system 100 includes a controller 105, a first motor 120A, a second motor 120B, a first wheel speed sensor 125A, a second wheel speed sensor 125B, a first drive wheel 130A, and a second drive wheel 130B. In some implementations, the drive system 100 may include a steering control 110 and a position sensor 115.

The controller 105 may include a processor 107, autonomous control logic 106, a memory 109, and various peripheral components that facilitate receiving signals from and controlling components external to the controller 105. While a single controller 105 is illustrated, it is understood that there may be any number of controllers and that the operations described herein as being performed by the illustrated controller 105 may be distributed among the controllers. In this regard, the controller 105 may be configured to communicate information over a communication bus used by the other controllers such as an I2C bus or another suitable bus to coordinate activities performed by the other controllers.

The processor 107 may correspond to, for example, an ARM® based processor, an Intel® based processor, or may be based on a different technology. The memory 109 may correspond to a non-transitory data storage that includes instruction code. The memory 109 may be in communication with the processor 107 and the instruction code may be executed by the processor 107 to cause the processor 107 to control various operations of the vehicle. Aspects of these operations are described in more detail below.

The autonomous control logic 106 may include logic that facilitates autonomous driving of the vehicle. For example, the autonomous control logic 106 may include artificial intelligence (AI) logic the processes information received by the controller and operates the motors 120A and 120B responsive to the information received. The AI logic may implement various machine learning techniques that facilitate autonomous control of the vehicle.

The memory 109 may store instruction code that is executed by the processor 107. For example, the instruction code may include an operating system, such as Windows®, Linux®, or a different operating system. The instruction code may include code that facilitates processing information received from the position sensor 115 and the wheel speed sensors 125A and 125B and for controlling the motors 120A and 120B responsive to the information received.

The steering control 110 corresponds to a user interface that facilitates steering the vehicle. For example, the steering control 110 may correspond to a pair of lap bars/levers, a steering wheel, a stick control, etc.

The position sensor 115 may be configured to generate information indicative of a position of the steering control 110. The information may correspond to an analog signal that changes in proportion to the position of the steering control 110 or a digital signal that provides a numerical representation of the position of the steering control 110.

In the case of a steering wheel, the position sensor 115 may indicate the angle of rotation of the steering wheel. For example, in the analog signal case, the signal may be biased at a particular voltage greater than zero that indicates the steering wheel is centered. Voltages above and below that voltage may indicate a direction and an amount by which the steering wheel is turned. In the case of a digital signal, a value of zero may indicate that the steering wheel is centered. Values greater than or less than zero may indicate a direction and an amount by which the steering wheel is turned. The values generated by the analog and digital signals to convey the position of the steering wheel may be different.

In the case of a pair of lap bars/levers, a position sensor may be provided for each lap bar. For example, in the analog signal case, the signal may be biased at a particular voltage greater than zero that indicates that the lap bar is centered. Voltages above and below that voltage may indicate a direction (forward or backward) and an amount by which the lap bar/lever is moved. In the case of a digital signal, a value of zero may indicate that the lap bar/lever is centered. Values greater than or less than zero may indicate a direction (forward or backward) and an amount by which the lap bar/lever is moved. The values generated by the analog and digital signals to convey the position of the lap bar/lever may be different.

The motors 120A and 120B may correspond to electric or hydraulic motors. A combustion engine (not shown) may generate the power that drives the motors 120A and 120B. For example, in the case of hydraulic motors, the combustion engine may drive a hydraulic pump (not shown). The hydraulic pump may then direct hydraulic fluid to the hydraulic motors responsive to, for example, the position of the steering control 110 or based on directives from the autonomous control logic 106. For example, a controller such as the controller of FIG. 1 may control the hydrostatic pump responsive to the position of the control levers.

In the case of electric motors, the combustion engine may drive an electric generator. A controller such as the controller of FIG. 1 may direct, or cause to be directed, electricity to the electric motors responsive to the position of the steering control 110 or based on directives from the autonomous control logic 106.

The wheel speed sensors 125A and 125b are configured to generate a wheel speed signal responsive to rotation of a given drive wheel 130A and 130b. An example wheel speed sensor 125A and 125B may generate a series of pulses, where each pulse represents an amount by which a given drive wheel 130A and 130b rotates. For example, each pulse may represent a 1° change in rotation of a drive wheel 130A and 130b. In this case, 360 pulses would correspond to one revolution of a drive wheel 130A and 130B. Another example wheel speed sensor 125A and 125B may generate a value such as a binary or hexadecimal value that specifies that angle of rotation of the drive wheel 130A and 130B. Another example wheel speed sensor 125A and 125B may generate an analog signal having a value (e.g., between 0 and 5 Volts) indicative of the angle of rotation of the drive wheel 130A and 130b.

In some examples, the signal generated by the wheel speed sensor 125A and 125B may indicate of the direction of rotation of the drive wheel 130A and 1308. For example, a signed hexadecimal value may be generated by the wheel speed sensor. A positive hexadecimal value may indicate clockwise rotation and a negative hexadecimal value may indicate counter-clockwise rotation. In another example, the polarity of the voltage associated with, for example, a pulse, may be used to specify the direction of rotation. For example a positive voltage may indicate clockwise rotation and a negative value may indicate counter-clockwise rotation. The wheel speed sensor 125A and 125B may convey the direction and speed of a given drive wheel 130A and 1308 in a different manner, including manners not yet known.

Figure 2:
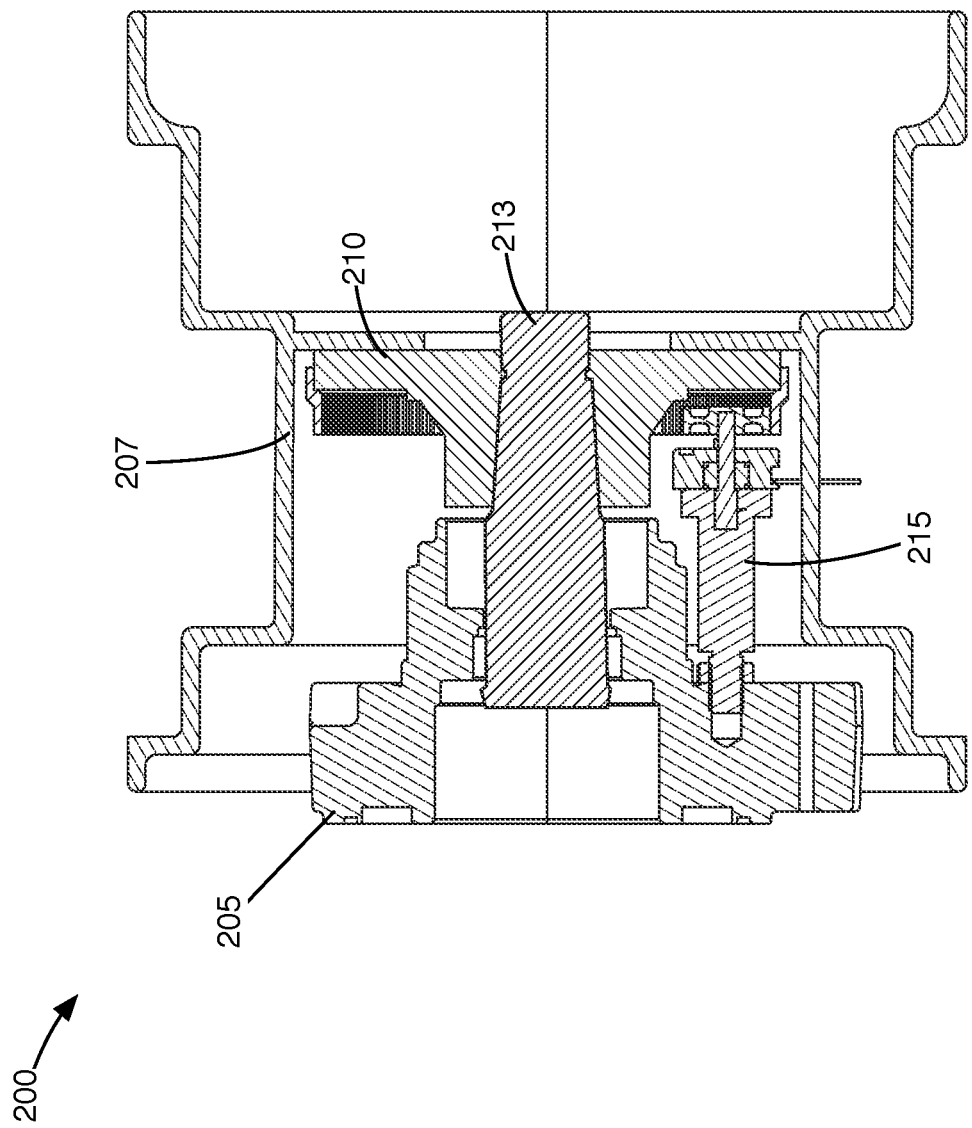
FIG. 2 illustrates a wheel coupled to the drive assembly, in accordance with an example.

FIG. 2 illustrates a cross-sectional view of a portion of an example drive assembly 200 for driving the drive wheels 130A and 1308 of a vehicle. The drive assembly 200 includes a motor housing 205, a wheel 207, a wheel hub 210, and a wheel speed sensor assembly 215.

The wheel 207 may correspond to a wheel utilized on a vehicle such as a ZTR vehicle. For example, the wheel 207 may include a rim and a tire (not shown) arranged on the rim. The rim may be formed from a metal material or other material suitable to support the weight of, for example, a ZTR vehicle. The tire may be formed from a rubber material and may be inflatable. In some examples, an inner tube (not shown) may be provided within the tire to inflate the tire.

The wheel 207 may be configured to be removably coupled to the wheel hub 210. For example, the wheel hub 210 may include a group of threaded lugs (not shown) that are configured to pass through openings in the wheel configured to receive the threaded lugs. Lug nuts may be arranged and tightened onto the lugs to fasten the wheel 207 to the wheel hub 210. Alternatively, the wheel hub 210 may define a group of threaded openings. Threaded lugs (not shown) may be inserted through openings in the wheel 207 that are configured to align with the threaded openings of the wheel hub 210 to fasten the wheel 207 to the wheel hub 210.

Figure 3B:
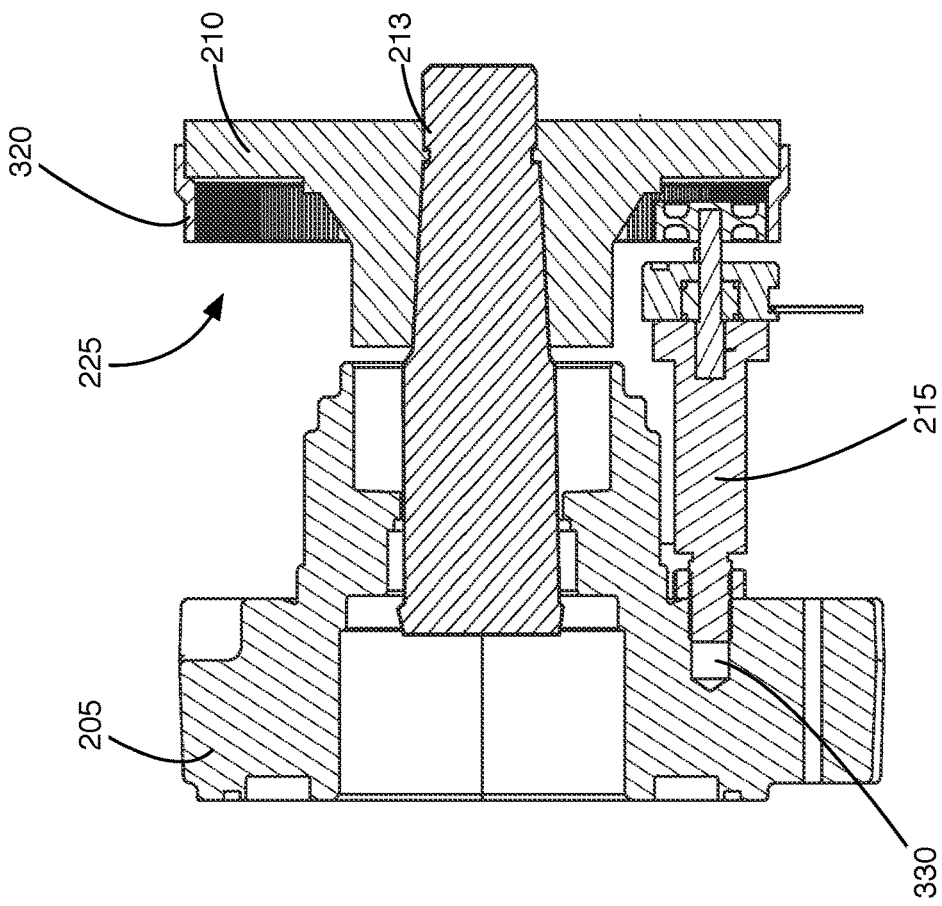
FIG. 3B illustrates a cross-sectional view of a portion of an example drive assembly for driving the wheels of a vehicle, in accordance with an example.
Figure 3A:
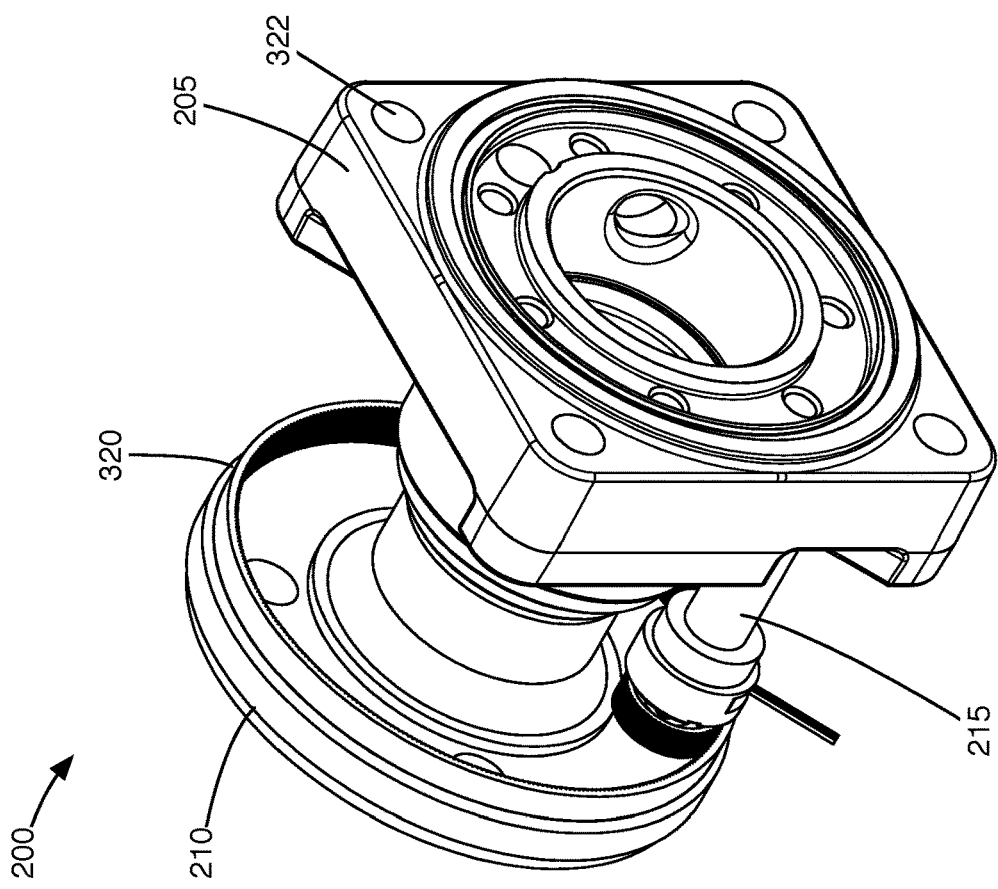
FIG. 3A illustrates a perspective view of a portion of an example drive assembly for driving the wheels of a vehicle, in accordance with an example.

FIGS. 3A and 3B illustrate perspective and cross-sectional views, respectively, of the motor housing 205, the wheel hub 210, and the wheel speed sensor assembly 215.

The motor housing 205 may correspond to a wheel-side housing portion of a motor such as a hydraulic gerotor motor, vane motor, or gear motor. In another example, the motor housing 205 may correspond to a wheel-side housing portion of an electric motor or another type of motor. In the illustrated example, the motor housing 205 has a generally square shape with filleted corners. In other examples, the motor housing 205 may have a different shape. For example, the motor housing 205 may have a circular shape, oblong shape, or rectangular shape. The corners of the motor housing may not be filleted and/or may have a fillet with a different radius than the one described above.

The motor housing 205 is configured to be coupled to a second motor housing portion (not shown). The two motor housing portions may be coupled together with, for example, bolts to encapsulate components of the motor such as, for example, gears, bearings, stators, brushes, and other components of the motor. In this regard, the motor housing 205 may define a group of openings 322 through which bolts may pass to facilitate coupling the motor housing 205 to the second motor housing portion.

The motor housing 205 may be formed from a rigid material, such as steel, that is capable of withstanding the various stresses and strains encountered by the motor during operation. Other suitable materials may be utilized to form the motor housing 205. Likewise, the bolts that may be utilized to couple the two motor housing portions together may be dimensioned to keep the two motor housing portions together under the various pressures and strains encountered by the motor during operation. portion.

In an example, the motor housing 205 may define a threaded bore 330 that facilitates coupling the wheel speed sensor 215 to the motor housing 205. In an example, the bore 330 is disposed on the wheel-side of the motor housing 205. The bore 330 may be formed to provide sufficient wall thickness between the inside of the bore and the inside of the motor to allow the wall of the motor to withstand the various stresses and strains encountered by the motor during operation.

The wheel hub 210 is configured to be rotatably coupled to a motor shaft 213. The motor shaft 213 may be disposed at least partially within the motor housing 205. For example, a portion of the motor shaft 213 may extend through the motor housing 205. A different portion of the motor shaft 213 may pass through the center of the wheel hub 210. The wheel-side end of the motor shaft 213 may be threaded and a nut (not shown) may be fastened on the threads to securely couple the wheel hub 210 to the motor shaft 213.

In an example, the wheel hub 210 may include a ring gear 320 on the motor-side 225 of the wheel hub 210. The ring gear 320 may be integrally formed with the wheel hub 210 or may be coupled to the wheel hub 210 after forming the wheel hub 210. For example, the ring gear 320 may be press-fit, welded, and/or fastened with fasteners to the wheel hub 210.

In an implementation, the ring gear 320 may be arranged around the periphery of the wheel hub 210. In another implementation, the ring gear 320 may be configured so that the periphery of the ring gear 320 is offset from the periphery of the wheel hub 210 by a distance.

The ring gear 320 may include teeth on an inward-facing side of the ring gear 320, as illustrated. In a different example, the teeth may be arranged on the opposite surface of the ring gear 320.

Figure 4:
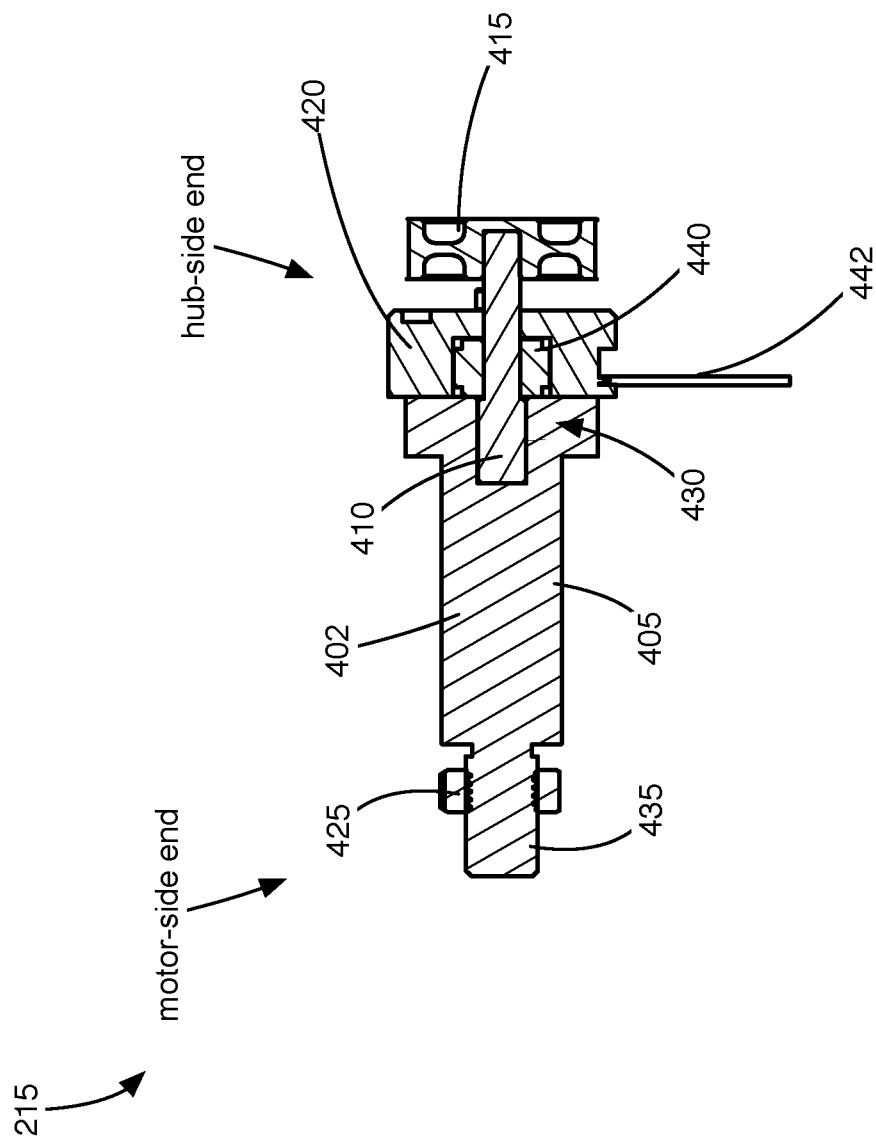
FIG. 4 illustrates details of the wheel speed sensor assembly, in accordance with an example.

FIG. 4 illustrates details of the wheel speed sensor assembly 215. As shown, the wheel speed sensor assembly 215 includes a mount 405, a shaft 410, an idler gear 415, a sensor 420, and a jam nut 425.

The mount 405 includes a hub-side end and a motor-side end. The hub-side end may define a channel 430 for receiving a motor-side end of the shaft 410. The motor-side end of the mount 405 may include a threaded surface 435 configured to mesh with a complementary threaded surface of the motor housing 205 to facilitate setting an amount of overlap between the idler gear 415 and the ring gear 320. In an example, the threaded surface 435 of the mount 405 is configured to mesh with the threaded inside surface of the bore 330 of the motor housing 205. The threaded surface 435 of the motor-side end of the mount 405 may correspond to a screw.

In the example of FIG. 4, the mount 405 may have various longitudinal lengths. Further, the mount 405 may be divided into three regions having different diameters or various other shapes. For example, the hub-side end of the mount 405 may have a diameter or hex or square or oblong shape and have various longitudinal lengths. The motor-side end of the mount 405 may have a diameter or hex or square or oblong shape and various longitudinal lengths. The central region 402 of the mount 405 may have a diameter or hex or square or oblong shape and various longitudinal lengths.

In the example of FIG. 4, the number of regions may be different. For example, the entire mount may have a uniform radius. Other variations are possible.

The jam nut 425 may be arranged on the motor-side end of the mount 405. The jam nut 425 may facilitate locking the amount of overlap between the idler gear 415 and the ring gear 320. In the case were the threaded surface 435 of the motor-side corresponds to a screw, the jam nut 425 may be threaded onto the screw.

The wheel speed sensor 420 may be arranged on the hub-side end of the mount 405. For example, the wheel speed sensor 420 may be fastened with, for example, screws (not shown) to the hub-side end of the mount 405. The wheel speed sensor 420 may define an opening through which the shaft 410 extends. The wheel speed sensor 420 may be configured to detect a rate of rotation and a direction of rotation of the shaft 410 and/or the idler gear 415 and to generate an output signal indicative of the rate of rotation and the direction of rotation of the shaft 410 and/or the idler gear 415. In an example, the wheel speed sensor 420 may corresponds to a hall type of sensor that includes quadrature output sensors that facilitate determining both the rate of rotation and the direction of rotation of a shaft that extends through the wheel speed sensor 420.

In an example, the wheel speed sensor 420 may be configured to detect the rotation of the of the shaft 410 and/or the idler gear 415 magnetically. For example, a magnet 440 may be arranged on the shaft 410 and/or the idler gear 415. The wheel speed sensor 420 may be configured to detect magnetic field fluctuations generated by the magnet 440 when the shaft 410 and/or the idler gear 415 rotates. The frequency of the magnetic field fluctuations may be utilized to determine the rotation rate of the shaft 410 and/or the idler gear 415.

In another example, the wheel speed sensor 420 may be configured to detect the rotation of the shaft 410 and/or the idler gear 415 optically. For example, the wheel speed sensor 420 may include a light source and a light detector that detects a light path from the light source. A slotted disk, that is a disk with a group of concentrically arranged slots, may be provided on the shaft 410 and arranged so that the slotted disk passes through the light path. Rotation of the shaft 410 causes the slotted disk to rotate, which results in light pulses reaching the light detector. The frequency of the light pulse may be utilized to determine the rotation rate of the shaft 410 and/or the idler gear 415.

The wheel speed sensor 420 may be configured to generate the wheel speed signal described above. For example, an example wheel speed sensor 420 may generate a series of pulses, where each pulse represents an amount by which a given drive wheel 130A and 130B rotates. For example, each pulse may represent a 1° change in rotation of a drive wheel 130A and 130B. In this case, 360 pulses would correspond to one revolution of a drive wheel 130A and 1306. An example wheel speed sensor 420 may generate a value such as a binary or hexadecimal value that specifies that angle of rotation of the drive wheel 130A and 1306. Another example wheel speed sensor 420 may generate an analog signal having a value (e.g., between 0 and 5 Volts) indicative of the angle of rotation of the drive wheel 130A and 1306.

An example wheel speed sensor 420 may generate a signal indicative of the direction of rotation of the drive wheel 130A and 1306. For example, a signed value may be generated by the wheel speed sensor 420, where, for example, a positive value indicates clockwise rotation of a wheel 130A and 1306 and a negative value indicate counterclockwise rotation of the wheel 130A and 1306. A different example wheel speed sensor 420 may convey the direction and speed of a given drive wheel 130A and 1306 in a different manner, including manners not yet known.

Information gathered by the wheel speed sensor 420 may be communicated to, for example, the control 105 via a wire 442. The wire 442 may include one or more conductors for communicating the information. In some example, the wheel speed sensor 420 may communicate information wirelessly. For example, it is contemplated that the wheel speed sensor 420 may include a battery that powers the sensor and that facilitates communicating information wirelessly. In another example, rotation of the shaft within the sensor may cause energy to be stored in, for example, a super capacitor that may be provided in the sensor. The stored energy may facilitate communicating the information wirelessly.

The idler gear 415 may be concentrically arranged on the hub-side end of the shaft 410. When assembled, the idler gear 415 is configured to overlap the ring gear 320 and to mesh with the ring gear 320. For example, the width of the ring gear 320 measured between the hub-side and the motor-side of the ring gear 320 may be such that the width of the idler gear 415 between the hub-side and motor-side of the idler gear 415 may be about 50% smaller to ensure that the ring gear 320 can overlap/meshes with the entire ring gear 320. In this regard, the threaded surface 435 of the mount 405 facilitates positioning the idler gear 415 relative to the ring gear 320 to facilitate complete overlap of the idler gear 415 by the ring gear 320. The jam nut 425 facilitates locking the mount 405 in position.

In an example, the size and/or the number of teeth on the idler gear 415 and the ring gear 320 may be configured so that when the ring gear 320 completes one rotation (i.e., one 360° rotation), the idler gear 415 completes multiple rotations such as multiple 360° rotations. This configuration may facilitate measuring, by the wheel speed sensor 420, the angle of rotation of a drive wheel 130A and 1306 coupled to the wheel hub 210 to within less than 1°, and in some examples to within 0.15°.

Figure 5:
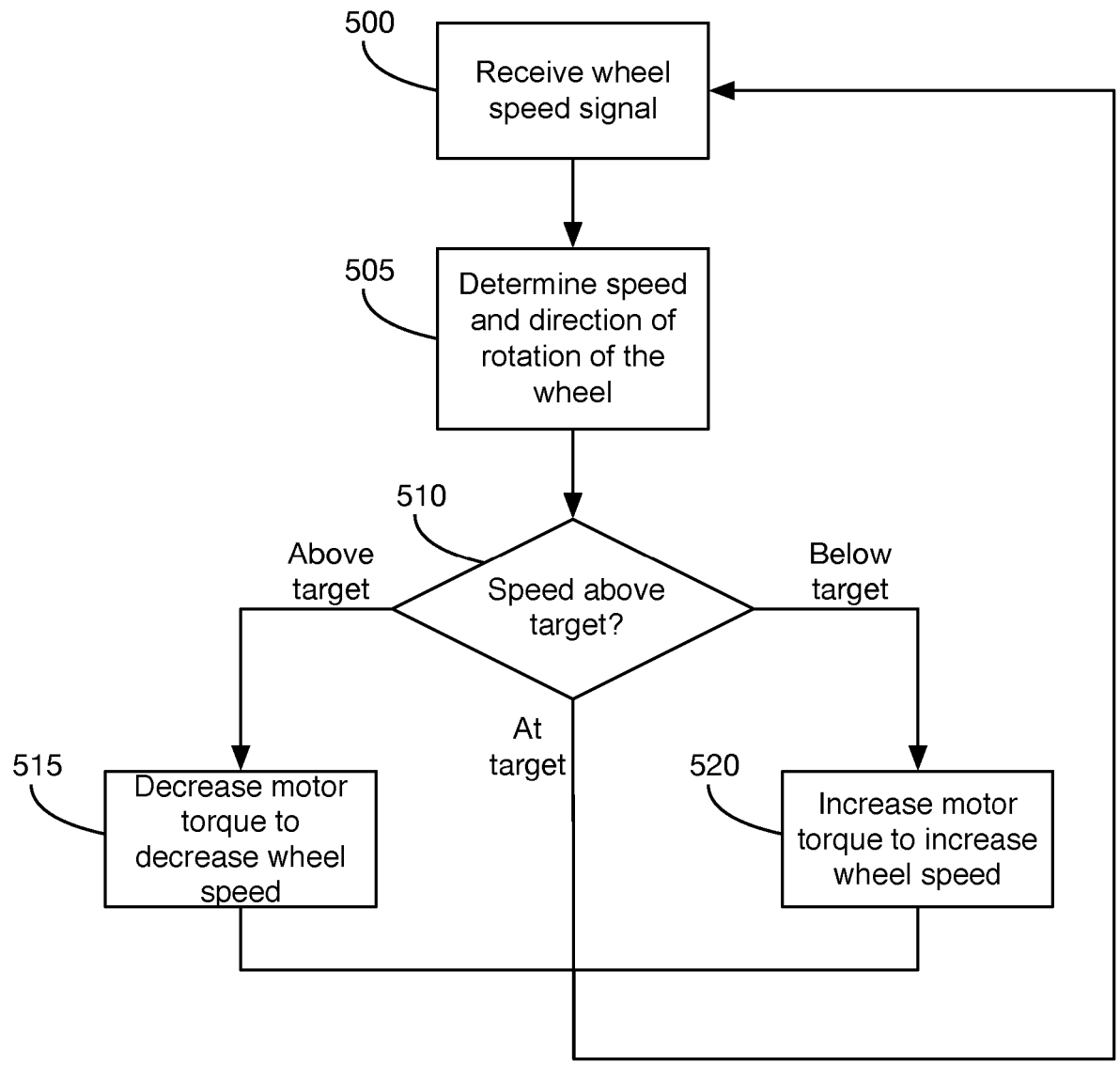
FIG. 5 illustrates exemplary operations performed by a controller of the drive system, in accordance with an example.

FIG. 5 illustrates examples of operations performed by the controller 105 of the drive system 100. In this regard, one or more of the operations may be implemented via instruction code, stored in the memory 109 of the controller 105, configured to cause the processor 107 of the controller 105 to perform the operations illustrated in the figures and discussed herein.

At operation 500, the controller 105 may receive a wheel speed signal. For example, the controller 105 may receive a wheel speed signal from a wheel speed sensor assembly 215 coupled to both a motor and a wheel hub 210 of the vehicle. For example, the controller 105 may receive the wheel speed signal generated by the wheel speed sensor 420 discussed above. The wheel speed signal generated by the wheel speed sensor 420 may facilitate measuring an angle of rotation of a drive wheel 130A and 130B coupled to the wheel hub 210 to within less than 1°, and in some examples to within 0.15°. For example, the wheel hub 210 may include a ring gear 320, such as the ring gear 320 discussed above. The wheel speed sensor assembly 215 may include an idler gear 415, such as the idler gear 415 discussed above. The ring gear 320 may be configured so that when the ring gear 320 completes one 360° rotation, the idler gear 415 completes multiple 360° rotations. This configuration may facilitate measuring, by the wheel speed sensor 420, the angle of rotation of a drive wheel 130A and 130B coupled to the wheel hub 210 to within less than 1°, and in some examples to within 0.15°.

At operation 505, the controller 105 may determine the speed and the direction of rotation of the wheel. For example, the wheel speed signal may correspond to a series of pulses, where each pulse represents an amount by which a given drive wheel 130A and 130B rotates. For example, each pulse may represent a change in rotation of a drive wheel 130A and 130B of about 1°. In this case, 360 pulses would correspond to one revolution of a drive wheel 130A and 130B. In another example, each pulse may represent a change in rotation of about 0.15°, in which case 2400 pulses would correspond to one revolution of a drive wheel 130A and 130B. Another example wheel speed sensor 420 may generate a value such as a binary or hexadecimal value that specifies that angle of rotation of the drive wheel 130A and 130B. Another example wheel speed sensor 420 may generate an analog signal having a value (e.g., between 0 and 5 Volts) indicative of the rotation of the drive wheel 130A and 130B.

In some examples, the wheel speed sensor 420 may generate a signal indicative of the direction of rotation of the drive wheel 130A and 130B, as described above. For example, a signed value may be generated by the wheel speed sensor 420, where the sign (+ or −) indicates the direction of rotation. The wheel speed sensor 420 may convey the direction and speed of a given drive wheel 130A and 130B in a different manner, including manners not yet known.

At operation 510, if the determined speed is above a target threshold, then at operation 515, the controller 105 may decrease motor torque to increase wheel speed. For example, if the target speed were 15 MPH and the actual speed of the vehicle was determined by the controller, via the information communicated from the wheel speed sensor 420, to be 16 MPH, the controller 105 may operate the motor 120A and 120B of the vehicle discussed above responsive to the wheel speed signal to decrease power to the motor 120A and 120B when the determined speed is above a target speed. The controller may continue decreasing motor torque until the actual speed reaches the target speed or until the actual speed falls within a range of the target speed, such as within 5% of the target speed.

If at operation 510, the determined speed is below the target threshold, then at operation 520, the controller 105 may lower motor torque to increase wheel speed. For example, if the target speed were 15 MPH and the actual speed of the vehicle was determined by the controller, via the information communicated from the wheel speed sensor 420, to be 14 MPH, the controller 105 may operate the motor 120A and 120B of the vehicle discussed above responsive to the wheel speed signal to increase power to the motor 120A and 120B when the determined speed is below the target speed. The controller may continue increasing motor torque until the actual speed reaches the target speed or until the actual speed falls within a range of the target speed, such as within 5% of the target speed.

Figure 6:
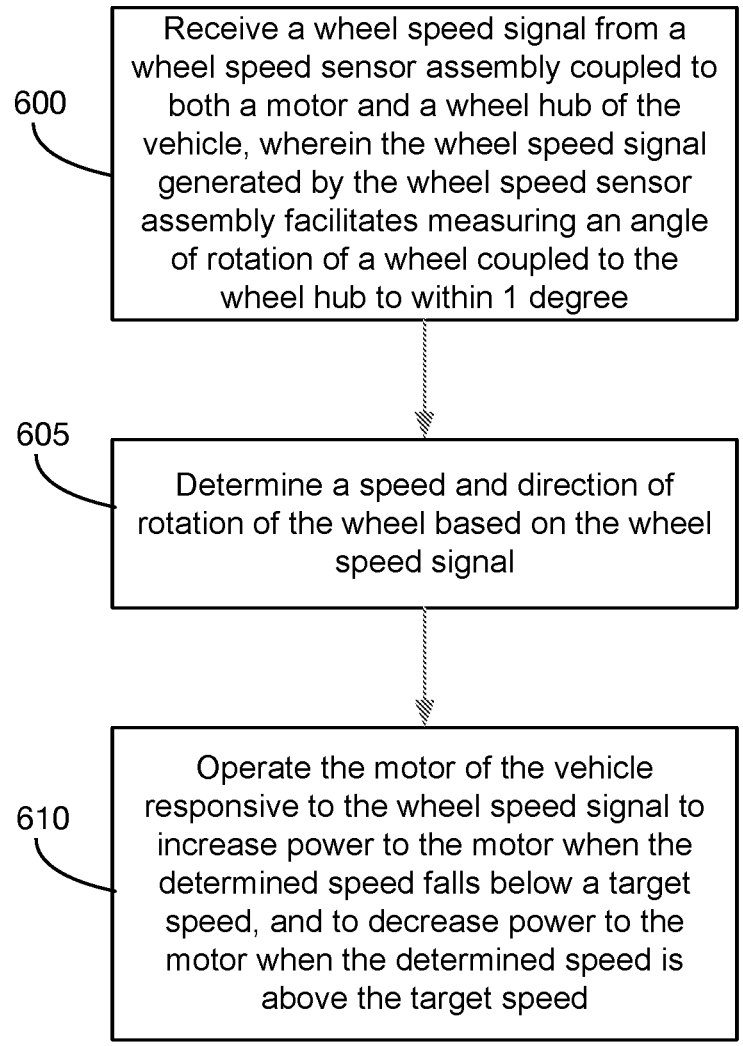
FIG. 6 illustrates a more detailed variation of FIG. 5, in accordance with an example.

FIG. 6 illustrates a more detailed variation of FIG. 5. Block 600 may involve receiving, by a controller 105, a wheel speed signal from a wheel speed sensor assembly 215 coupled to both a motor 120A and 120B and a wheel hub 210 of the vehicle, wherein the wheel speed signal generated by the wheel speed sensor assembly 215 facilitates measuring an angle of rotation of a drive wheel 130A and 130B coupled to the wheel hub 210 to within less than 1°, and in some examples to within 0.15°.

Block 605 may involve determining, by the controller 105, a speed and direction of rotation of the drive wheel 130A and 130B based on the wheel speed signal.

Block 610 may involve operating, by the controller 105, the motor 120A and 120B of the vehicle responsive to the wheel speed signal to increase power to the motor 120A and 120B when the determined speed falls below a target speed, and to decrease power to the motor 120A and 120*b* when the determined speed is above the target speed.

In some examples, receiving the wheel speed signal may involve rotating, by a ring gear 320 on the wheel hub 210, an idler gear 415 of the wheel speed sensor assembly 215; and receiving, by a sensor 420 arranged proximate to a shaft 410 coupled to the idler gear 415, the wheel speed signal.

While the systems and methods of operation have been described with reference to certain examples, it will be understood by those skilled in the art that various changes may be made and equivalents may be substituted without departing from the scope of the claims. Therefore, it is intended that the present methods and systems not be limited to the particular example disclosed, but that the disclosed methods and systems include all embodiments falling within the scope of the appended claims.

The invention claimed is:

1. A motor for a vehicle, the motor comprising:
   a motor housing;
   a motor shaft disposed at least partially within the motor housing;
   a hub, coupled to the motor shaft, configured to be coupled to a wheel of the vehicle; and
   a wheel speed sensor assembly having a first end coupled to the motor housing and a second end rotatably coupled to the hub via an idler gear having teeth meshing with respective teeth of a gear coupled to the hub, wherein the wheel speed sensor assembly is configured to generate a wheel speed signal that facilitates determination of a speed and direction of rotation of the wheel.

2. The motor according to claim 1, wherein the wheel speed sensor assembly comprises:
   a shaft, different from the motor shaft, and having a first end coupled to the idler gear;
   a mount having a hub-side end that defines a channel for receiving a second end of the shaft; and a sensor, arranged on the hub-side end of the mount, that defines an opening through which the shaft extends.

3. The motor according to claim 2, wherein the sensor is configured to detect a rate of rotation and a direction of rotation of the shaft and to generate an output signal indicative of the rate of rotation and the direction of rotation.

4. The motor according to claim 1, wherein the gear coupled to the hub includes a ring gear that extends around a periphery of the hub, wherein the idler gear overlaps the ring gear and meshes with the ring gear.

5. The motor according to claim 4, wherein the ring gear and the idler gear are configured so that when the ring gear completes one rotation, the idler gear completes multiple rotations.

6. The motor according to claim 4, wherein a motor-side end of the mount comprises a threaded surface configured to mesh with a complementary threaded surface of the motor housing to facilitate setting an amount of overlap between the idler gear and the ring gear.

7. The motor according to claim 6, wherein the threaded surface of the motor-side end of the mount corresponds to a screw, and wherein the threaded surface of the motor housing is formed on an inside surface of a bore of the motor housing configured to receive the screw.

8. The motor according to claim 6, further comprising a jam nut, arranged on the motor-side end of the mount, that facilitates locking the amount of overlap between the idler gear and the ring gear.

9. The motor according to claim 2, further comprising a magnet arranged on the shaft, wherein the sensor is configured to detect magnetic field fluctuations generated by the magnet when the shaft rotates, and to generate an output signal indicative of a rate of rotation based on the magnetic field fluctuations.

10. The motor according to claim 2, wherein the shaft comprises a slotted disk and the sensor is configured to optically detect rotation of the shaft via the slotted disk.

11. The motor according to claim 1, wherein the motor corresponds to a hydraulic motor.

12. A vehicle comprising:
a motor that includes:
a motor housing;
a motor shaft disposed at least partially within the motor housing;
a hub, coupled to the motor shaft, configured to be coupled to a wheel of the vehicle; and
a wheel speed sensor assembly having a first end coupled to the motor housing and a second end rotatably coupled to the hub, wherein the wheel speed sensor assembly is configured to generate a wheel speed signal that facilitates determination of a speed and direction of rotation of the wheel; and
a controller, in communication with the wheel speed sensor assembly, configured to operate the motor responsive to the wheel speed signal generated by the wheel speed sensor assembly.

13. The vehicle according to claim 12, wherein the controller is configured to determine a speed of the wheel based on the wheel speed signal, wherein the controller is further configured to increase power to the motor when the determined speed falls below a target speed.

14. The vehicle according to claim 13, wherein the controller is further configured to decrease power to the motor when the determined speed is above the target speed.

15. The vehicle according to claim 12, wherein the wheel speed sensor assembly comprises:
an idler gear;
a shaft having a first end coupled to the idler gear;
a mount having a hub-side end that defines a channel for receiving a second end of the shaft; and
a sensor, arranged on the hub-side end of the mount, that defines an opening through which the shaft extends.

16. The vehicle according to claim 15, wherein the sensor is configured to detect a rate of rotation and a direction of rotation of the shaft and to generate an output signal indicative of the rate of rotation and the direction of rotation.

17. The vehicle according to claim 15, wherein the hub includes a ring gear that extends around a periphery of the hub, wherein the idler gear overlaps the ring gear and meshes with the ring gear.

18. The vehicle according to claim 17, wherein the ring gear and the idler gear are configured so that when the ring gear completes one rotation, the idler gear completes multiple rotations.

19. A method for operating a vehicle, the method comprising:
receiving, by a controller, a wheel speed signal from a wheel speed sensor assembly coupled to both a motor housing and a wheel hub of the vehicle, wherein the wheel speed signal generated by the wheel speed sensor assembly facilitates measuring an angle of rotation of a wheel coupled to the wheel hub to within less than 1°;
determining, by the controller, a speed and direction of rotation of the wheel based on the wheel speed signal; and
operating, by the controller, the motor of the vehicle responsive to the wheel speed signal to increase power to the motor when the determined speed falls below a target speed, and to decrease power to the motor when the determined speed is above the target speed.

20. The method according to claim 19, wherein receiving the wheel speed signal comprises:
rotating, by a ring gear on the wheel hub, an idler gear of the wheel speed sensor assembly; and
receiving, by a sensor arranged proximate a shaft coupled to the idler gear, the wheel speed signal.

* * * * *